United States Patent [19]

Colasito et al.

[11] Patent Number: 5,334,533
[45] Date of Patent: Aug. 2, 1994

[54] OIL CONTAMINATION CLEAN-UP BY USE OF MICROBES AND AIR

[76] Inventors: Dominic J. Colasito, 2707 Panorama, Bakersfield, Calif. 93306; Mery C. Robinson, 4106 Lemnos, Ocean Hills, Calif. 92056; Alvin J. Smith, 4379 Modoc Rd., Santa Barbara, Calif. 93110

[21] Appl. No.: 519,827

[22] Filed: May 7, 1990

[51] Int. Cl.$^5$ .................. D06M 16/00; C02F 3/00
[52] U.S. Cl. .................. 435/264; 435/262.5; 435/248; 210/601
[58] Field of Search .............. 435/248, 262, 264; 210/601

[56] References Cited

U.S. PATENT DOCUMENTS

| | | | |
|---|---|---|---|
| 3,951,804 | 4/1976 | Smith | 210/170 |
| 4,021,348 | 5/1977 | Smith | 210/208 |
| 4,207,180 | 6/1980 | Chang | 435/262 |
| 4,386,121 | 5/1983 | Knowlton | 435/262 |
| 4,849,360 | 6/1989 | Norris et al. | 435/264 |

*Primary Examiner*—Douglas W. Robinson
*Assistant Examiner*—Jeffrey J. Sevingny
*Attorney, Agent, or Firm*—William W. Haefliger

[57] ABSTRACT

A method of controlling hydrocarbon contamination at a zone of contaminant concentration that includes determining the locus of contamination; and dispersing into the locus a substance that reacts with the hydrocarbon to produce $CO_2$ and water to thereby decontaminate the locus; the dispersing including concentrating the substance in a porous zone, and forcing fluid under pressure into and through that zone to entrain and carry the substance to the contamination locus.

3 Claims, 5 Drawing Sheets

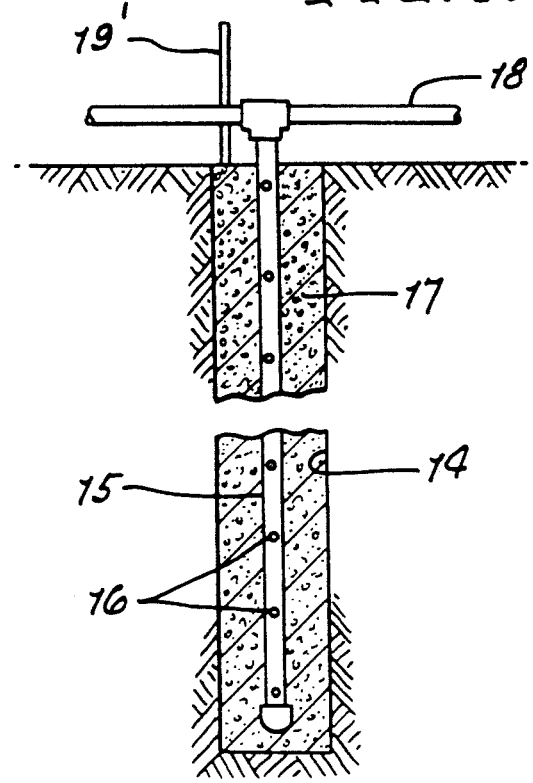
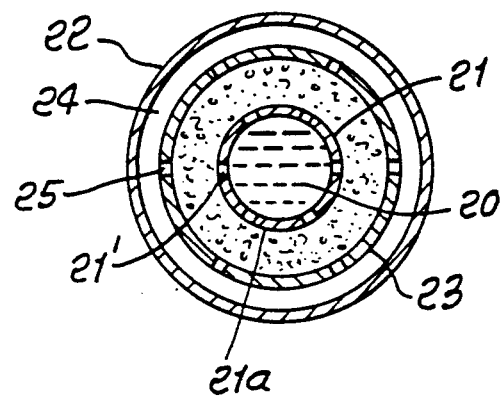
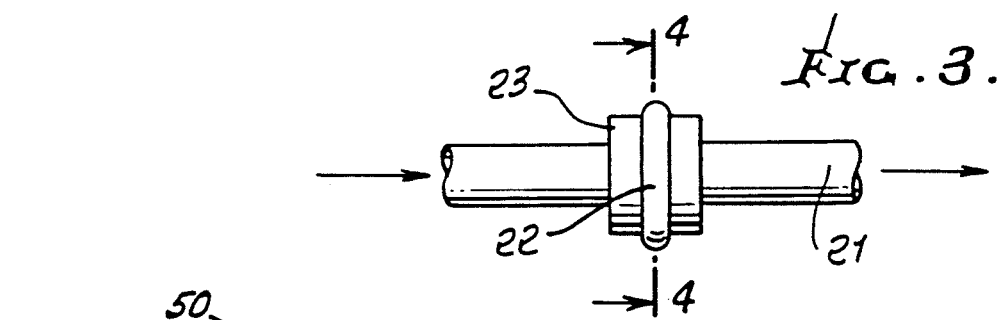
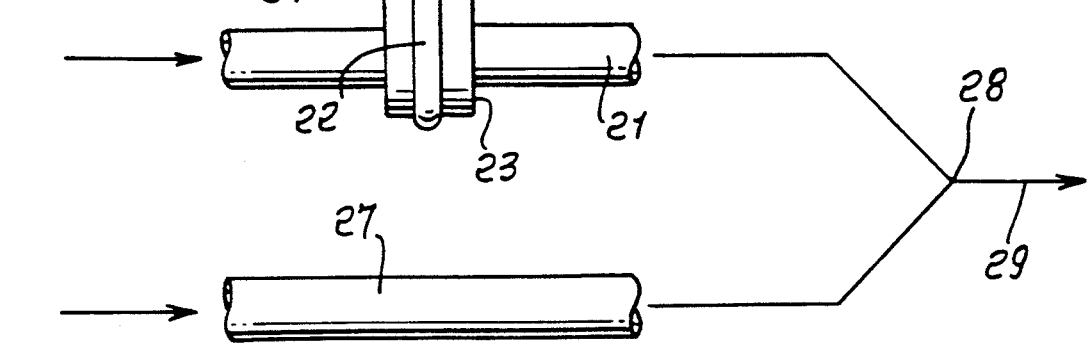

OIL CONTAMINATION CLEAN-UP BY USE OF MICROBES AND AIR

BACKGROUND OF THE INVENTION

This invention relates generally to cleanup of hydrocarbon spills, and more particularly to dispersing of microbes into hydrocarbon pollutant-containing zones to reduce pollutant levels.

Hydrocarbon pollution occurs in many ways, and areas, among which are the following:

1) spillage into the ground as at gasoline service stations (i.e., from rusted tanks, etc.);

2) leakage into the ground, i.e., formation, at or near oil wells; and 3) spillage into the ocean as from oil tanks or oil tankers, and also from bilge pumped into the sea.

Cleanup of such hydrocarbon pollutants is difficult, time consuming and expensive. While microbes have been employed to consume hydrocarbons, it is difficult to deploy the microbes, accurately and in sufficient quantity into pollutant spills.

SUMMARY OF THE INVENTION

It is a major object of the invention to provide method and apparatus whereby microbes can be easily and accurately deployed or dispersed into pollution zones, to consume hydrocarbons, the end products of such consumption being carbon dioxide and water. After such removal of the hydrocarbons, the remaining microbes then expire due to lack of "food".

More specifically, the method of controlling contamination at a zone of contamination concentration includes:

a) determining the locus of contamination, and b) dispersing into the locus a substance that intercepts the flow, and that reacts with the hydrocarbon to produce $CO_2$ and water, to thereby decontaminate the flow, c) the dispersing including concentrating the substance in a porous zone, and forcing fluid under pressure into and through the zone to entrain and carry the substance to the contamination locus.

As will appear, the substance typically includes bacteria characterized as consuming the hydrocarbon; and such bacteria may be injected into porous gravel, or the like, from which the concentrated bacteria is carried by fluid or fluid bubbles, toward and into the hydrocarbon contamination zone. Such fluid may include oxygen to aid the consumption of the hydrocarbon.

The means for forcing fluid into the bacteria may include fluid lines and/or bubble dispersers arranged to feed fluid including $O_2$, under pressure, into the porous zone or zones containing the bacteria for dispersing the latter into the hydrocarbon zone. If the hydrocarbon is draining, the bacteria may be dispersed from a multiplicity of holes in the earth, about the contamination zone, to form a bacteria barrier intercepting the hydrocarbon flow.

The process can be used to increase oil production in low production oil wells as the bacteria tend to consume high gravity oil deposits that block the flow of lighter gravity crude in underground formations. In long oil pipelines, microbes can be used to change the gravity of oil to obtain a lighter gravity product, thereby saving crude transportation time and costs. Hard to refine oil (sulfur) can be reduced by forming other compounds with microbes added. Oil wells can be made to produce more oil, change gravity, change sulfur content, and change from sour to sweet using the process. It is possible to treat the oil first with bacteria solution and air, then add it to the pipeline at the delivery end of the pipe, so that the oil will be changed to a more usable end product.

Some of the material that can be handled are: oils, gasoline diesel fuel, pesticides, cutting fluids, dry cleaning fluids, torpedo propellants, and other solvents.

These and other objects and advantages of the invention, as well as the details of an illustrative embodiment, will be more fully understood from the following specification and drawings, in which:

DRAWING DESCRIPTION

FIG. 2 is an enlarged elevation, in section, showing an air and microbe dispersing means;

FIG. 3 is an elevation showing a treatment arrangement for oil in a pipeline;

FIG. 4 is an enlarged sectional view taken on lines 4—4 of FIG. 3;

FIG. 5 is a view like FIG. 4 but showing an additional oil pipeline connected with the treated oil pipeline;

DETAILED DESCRIPTION

Figure 1:
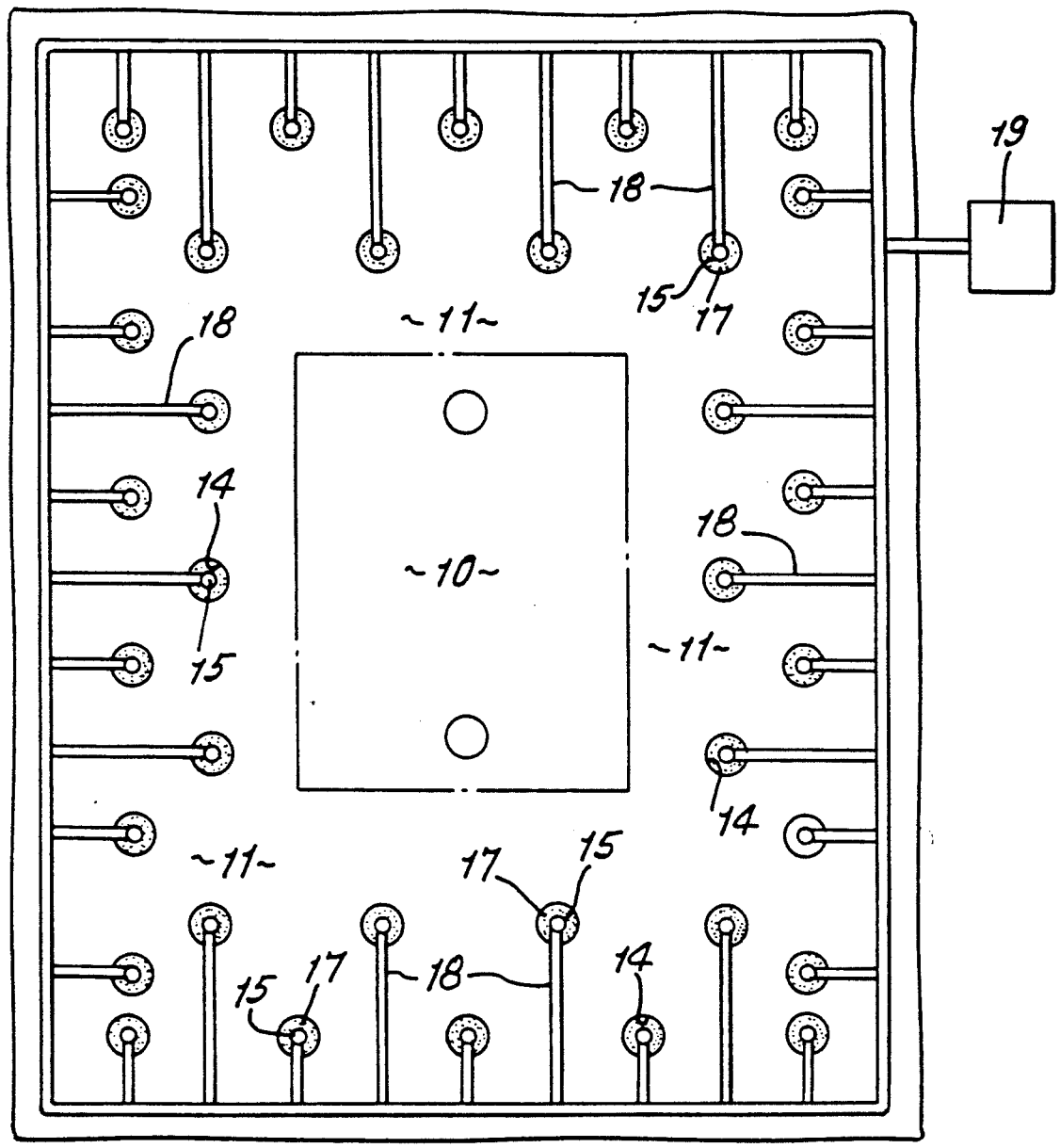
FIG. 1 is a plan view showing a treatment system for a contamination zone.

In FIGS. 1 and 2, a zone of contamination is indicated at 10, and a surrounding zone locus of contamination is indicated at 11. For example, zone 10 may be the immediate area (gravel, sand, earth, etc.) from which an underground, rusted, gasoline tank (as at a former gasoline service station) has been removed; and zone 11 is the immediately surrounding underground formation (gravel, sand, earth, etc.). Oil or gasoline may have penetrated heavily into the zones 10 and 11, which may be quite large, and the problem of decontamination is presented. In this regard, if physical removal of the formation material is to be avoided, as may be desired, it must somehow be decontaminated in situ.

In accordance with the invention, the method of controlling hydrocarbon contamination at a zone of contamination concentration includes determining the locus of such contamination, and then dispersing into that locus a substance that intercepts the contamination and reacts with the hydrocarbon to produce $CO_2$ and water, thereby decontaminating that locus. Such dispersing includes concentrating the substance, as for example bacteria, in a porous zone, and forcing fluid under pressure into and through the zone to entrain and carry the substance into the contaminated locus.

More specifically, in FIGS. 1 and 2, vertically elongated holes 14 are formed in the earth, as at numerous locations about the zones 10 and 11. Pipes or ducts 15 are extended downwardly into the holes, the pipes being perforated along their lengths, as at side openings or holes 16. Then, gravel 17 is filled into the holes and about the pipes, the gravel saturated with an aqueous bacteria solution, the bacteria characterized as consuming hydrocarbons such as oil, grease, and other contaminants. A supply pipeline 18 is connected to the upper end of each pipe 15 for supplying fluid, such as water or other O₂ containing fluid under pressure, to the pipes. Such fluid may be supplied from a source 19, and passes through the holes 16 to entrain the bacteria in the gravel 17, forcing it into or about zones 10 and 11 for percolation into contact with the hydrocarbon at zones 10 and 11. Gravel 17 aids in dispersing the O₂ and bacteria solution for penetrating the earth. Fluid bubbles are also thereby formed to assist the penetration.

Note in FIG. 1 that the holes are located at different distances from zones 10 and 11, and peripherally about , i.e., at different lateral sides of those zones to define a barrier about them so that bacteria penetrate into zones 10 and 11 from all sides. Testing of the composition of the soil may first be carried out by drilling or forming one or more such holes and testing the removed earth for hydrocarbon presence.

The holes 16 are typically formed in at least one side of each pipe, i.e., the sides facing the zones 10 and 11. The holes 14 in the ground may have diameters between 3 and 8 inches, and the holes may vary in length, i.e., be of a depth approximately corresponding to the depth of the contaminated soil, as determined by testing, as referred to.

FIG. 2 shows a line 19 for supplying additional bacteria-containing solutions into the gravel. Such solutions are typically aqueous.

FIGS. 3 and 4 show application of the invention to oil 20 flowing in a pipeline 21. The line is perforated as by holes 22 at section 21a of its length; and gravel is packed about the section 21a, the gravel being porous to oxygen-carrying gas supplied to the gravel via a pipe ring 22 about the jacket 23 that contains the gravel. Ring 22 contains holes 24 that pass the fluid into the gravel via corresponding holes 25 in the jacket. A microbe containing fluid supply line is shown at 26. In this way, microbes are used to change the gravity of the oil, i.e., reduce it, to derive a more desirable product downstream.

FIG. 5 shows that oil in line 22 can be blended with non-treated oil in a line 27, and at junction 28 to derive a desired gravity product at 29. Pump 50 and valve 51 control air to 22.

Figure 6:
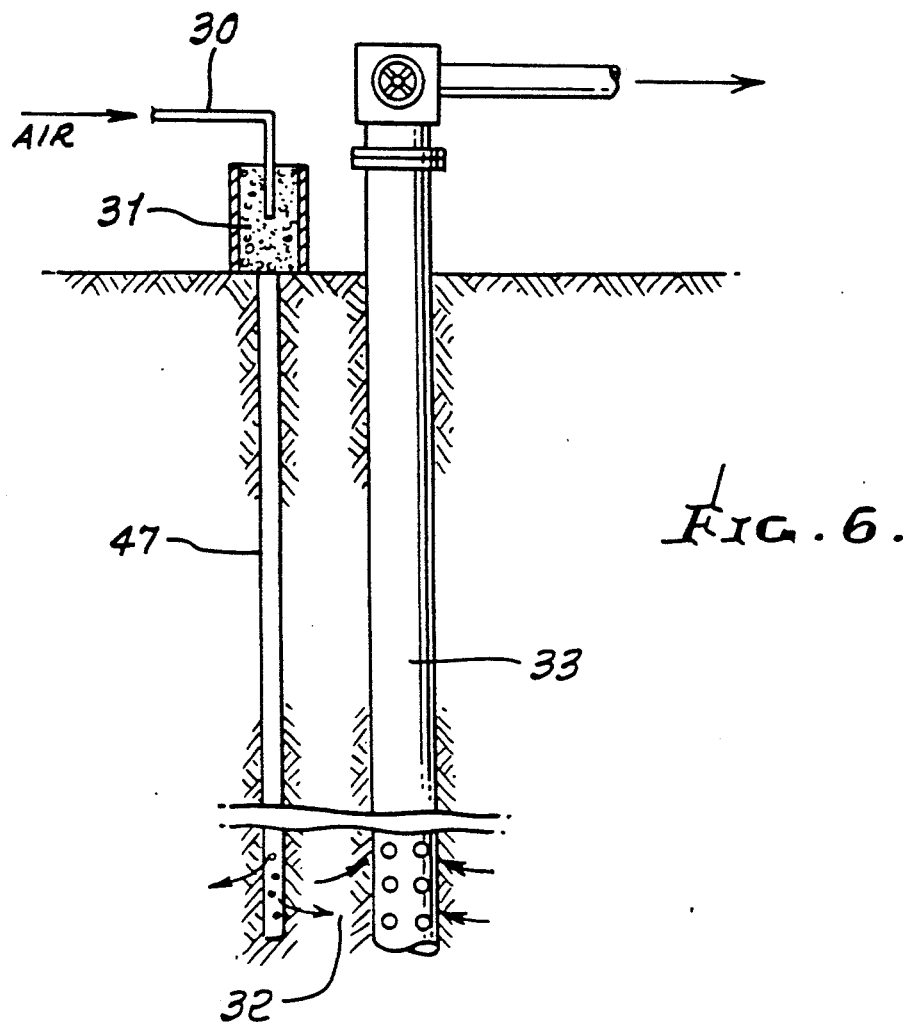
FIG. 6 is an elevation showing application of the invention to an oil well.

FIG. 6 shows air being passed at 30 into gravel bed 31 containing bacteria solution, as described. The air bubbles through the gravel, entraining bacteria, and passing them downward in a pipe 47 in the ground for discharge into shallow underground zone 32 from which petroleum is being produced and received upwardly in well pipe 33. Oil production is increased because the bacteria in zone 32 tend to consume heavier, tar-like deposits in the sandy formation 32, opening it up for increased flow or passage of flowable oil.

Figure 7:
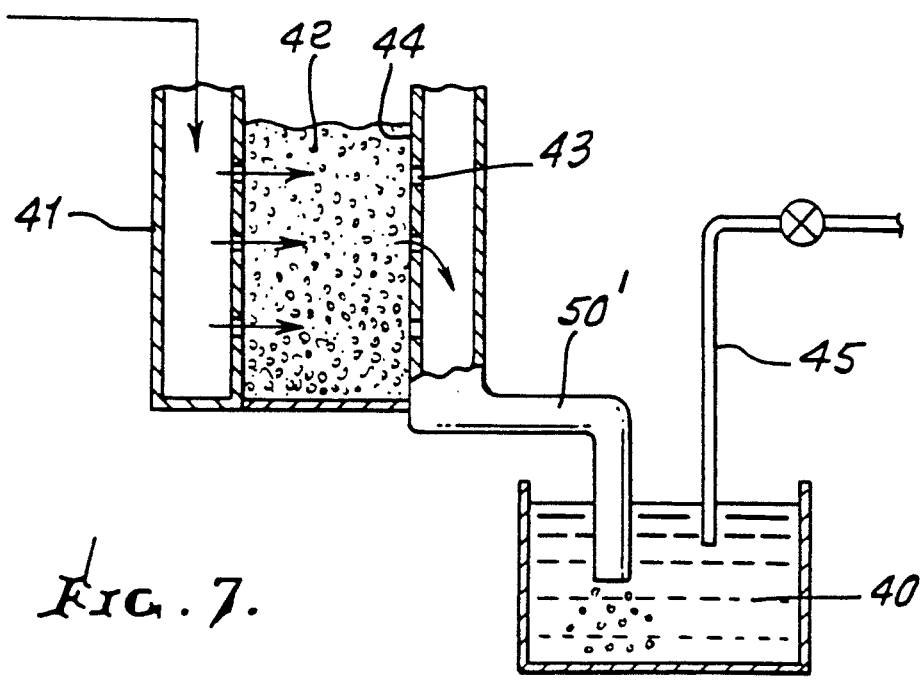
FIG. 7 is an elevation showing application of the invention to ship's ballast water, or other water bodies.

FIG. 7 shows treatment of hydrocarbon contaminated vessel ballast water 40 by passing or bubbling microbes entrained in air into the water. See air line 41 passing air into gravel bed 42 containing bacteria solution. From bed 42, the air entrained bacteria pass via holes 43 in a wall 44, into a pipe 50 leading to the ballast water. The treated and decontaminated water is then pumped out at 45 to the vessel.

Oil tankers either haul ½ load oil and ½ load of ballast, or they need expensive treatment facilities on land to treat the ballast before they can load up at full load of oil. This invention also enables cleanup of the problem with no residual oil left over. Oil spills can be treated in the same or similar manner, in the ocean or on shore, with minor variations of the process. With hard to refine oil, sulfur can be reduced by forming other compounds with microbes added. Oil wells can be made to produce more oil, change gravity, change sulfur content, and change from sour to sweet with this process. Oil pipelines can also be treated. It is possible to treat the oil first with bacteria solution and air, then add to the pipeline at the other end of the pipe; the oil will then be changed to a more usable end product.

Some of the materials that can be handled in this manner are: oils, gasoline diesel fuel, pesticides, cutting fluids, dry cleaning fluids, torpedo propellants, and other solvents.

Usable bacteria include: Achromobacter, Arthrobacter, Aspergillus, Bacillus, Candida, Cladosporium, Corynebacterium, Myrothecium, Nocardia, Punicillium, Phialophora, Pseudomonas, Rhodotorula, Streptomyces, Trichoderma, and a blend of Anaerobic and Facultative Organisms.

Figure 8:
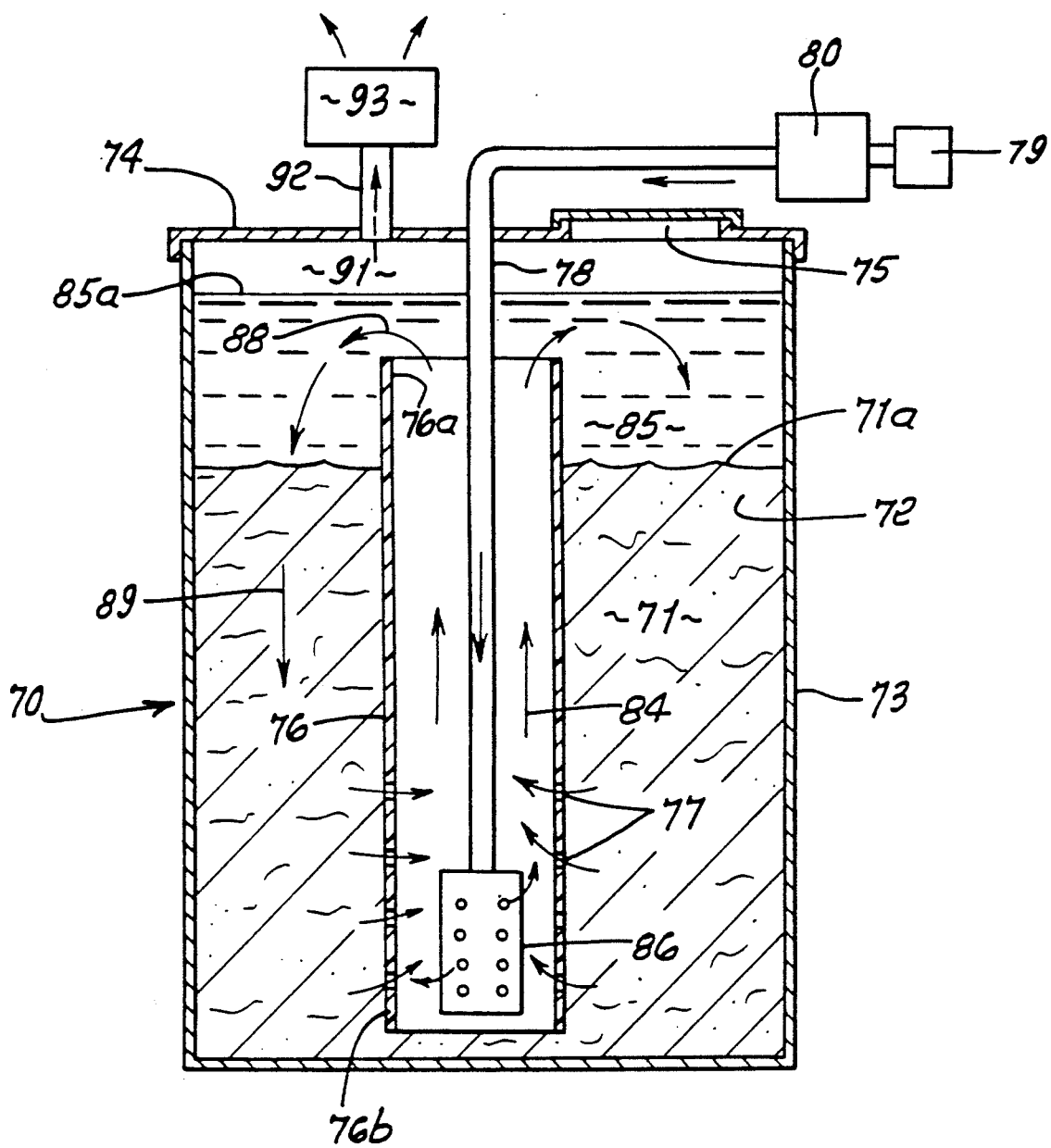
FIGS. 8–10 are elevations showing modifications.

In FIG. 8, a container 70 contains hydrocarbon containing waste material, such as oil or gasoline absorbent solid material 71 (granular for example) that may be used in or around gasoline or fuel filling stations. Material 71 may also include or consist of pesticide residue in granular form, for example. It is placed in zone or space 72 formed, for example, by a tank 73, after lid 74 is removed, or via an opening 75 in that lid.

Also located in zone 72 is a vertical duct 76 that extends upwardly at 76a above the level 71a of material 71, and downwardly at 76b to near the bottom of zone 72. The lower side wall of duct 76 is perforated as at 77. Duct 76 may consist of polyvinychloride (PVC). An air line 78 extends from a blower 79 and plenum 80 to the tank, and downwardly through lid 74, and within the duct 76 to near the bottom of same to supply air under pressure to pass via perforations in a mixer (air-to-water) chamber 86 so that air and water rise in duct 76 (see arrows 84).

Microbe containing aqueous solution 85 fills the zone 72, and the duct 76 to a level 85a above the top of the duct upper extent 76a. In operation, the air and solution mixture leaving chamber 86 under pressure tends to circulate or lift the liquid in duct 76 upwardly, drawing liquid inwardly through perforations 77; and the mixture leaving the top of duct 76 flows laterally outwardly at 88, and then downwardly at 89 through the porous material 71 for treating same (the mixture and O₂ react with the hydrocarbons in 71, to convert them to CO₂ and water), such circulation continuing while the blower 79 is operated. Vapors (air and CO₂ and hydrocarbon vapor) are exhausted from the upper interior 91, as via a port 92 and a carbon filter 93 to trap the hydrocarbon vapor.

After decontamination of the material 71, it can be removed from the zone 72 or tank 73, for example after lid 74 is removed, or opening 75 is uncapped, enabling reuse of the hydrocarbon decontaminated material, as around filling stations, or other absorbent use.

Figure 9:
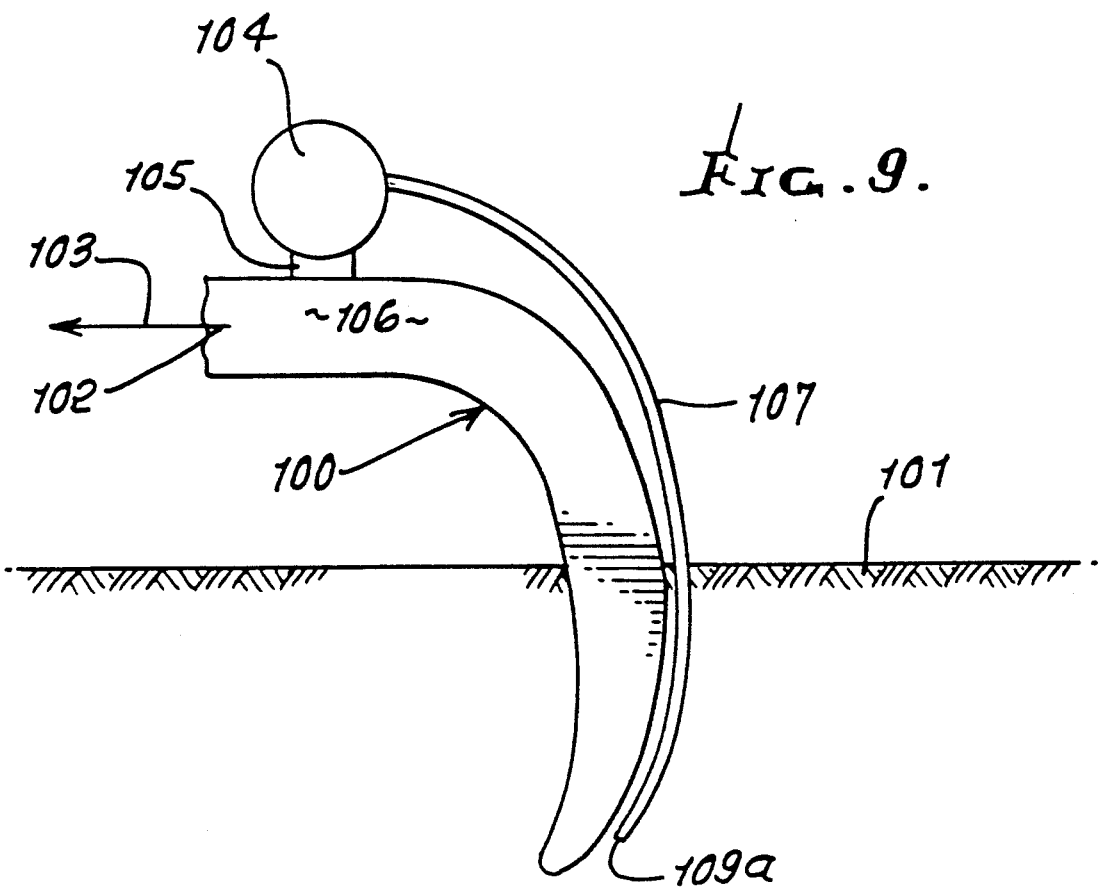

FIG. 9 shows a tiller or ripper 100 which extends downwardly into soil 101. The tiller is pulled at 102 in direction 103 as by a tractor. A bacteria solution tank 104 is carried at 105 on the apparatus 106 associated with the tiller, and it feeds bacteria containing solution to an injector or injector line 107 extending downwardly adjacent the back side of the tiller. Bacteria solution (aqueous) is fed into the soil 101 at 109a to treat hydrocarbon therein, and decontaminate it. This can be employed as at a beach onto which crude oil washes up, as from oil spill from a vessel, or from an offshore drilling or production platform.

Figure 10:
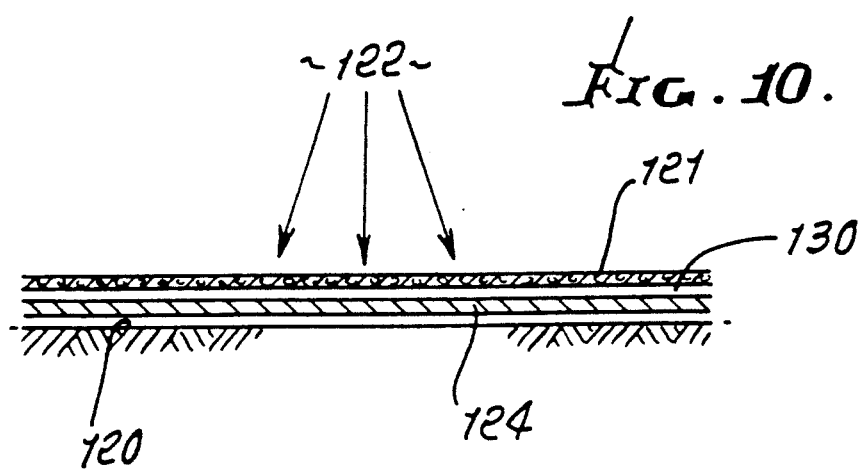

FIG. 10 shows an ocean surface 120 onto which an oil slick 121 is formed. When microbe containing solution is sprayed as at 122 onto the slick, the solution penetrates downwardly through the slick and floats at 124 above the ocean surface 120, and below the slick, whereby the microbes in the solution layer 124 can act upon the hydrocarbons in the slick, at contact area 130, converting them to $CO_2$ and water. A helicopter can be employed to provide the spray 122, as from a tank having a porous spray-producing means, on the helicopter. The following is an example of a technique for successful treatment of the slick:

1. Mix microbes with bio-degradable surfactant in an aqueous solution (about 6 PPM microbes). The amount of surfactant is variable, and is used as an aid to microbe action. The surfactant is typically a liquid and may be of the known type as an end for cleaning oil-covered surfaces at filling stations. Apply the mixture to the slick within 10 hours after slick formation.
2. Within about two hours of the first application, apply a corresponding second solution to the slick, and at a higher microbe concentration (about 200 PPM) .
3. Within two more hours, and at highest ambient temperature of the atmosphere of the day, apply another corresponding solution to the slick, wherein the concentration of the microbes is again raised for example to about 1,000 PPM.
4. Thereafter, at about two hour intervals, apply corresponding solutions to the slick until it disappears. The microbe concentration in each such solution shall be elevated to about 2,000 PPM.
5. After about 72 hours the slick will normally be reduced to the point that it will not adhere to birds.

Such treatment can also be carried out over beach and other oil contaminated surface areas.

The microbe-containing solution may consist of a concentrate of naturally occurring bacteria (aerobic and/or anaerobic) in water. The solution is prepared by soaking bacteria-containing particles (for example the product known as "WASTE GD" produced by Janco, Inc., St. Louis, Mo.) in water for 1-10 hours to form the concentrate. For example about 120 grams of such particles is soaked in 15 gallons of water. That concentrate is then diluted (100 to 3,500 parts of concentrate to 1,000,000 parts of water) to form the solution that is sprayed. Preferably about 3000 PPM is used.

I claim:

1. The method of reducing hydrocarbon contamination at a locus of contamination concentration in an underground in situ formation and employing bacteria that consume hydrocarbon includes:

a) determining the locus of contamination by drilling multiple test holes downwardly in the formation and testing the drilling formation composition for presence of contamination, via the test holes, thereby to determine the boundary of said locus of contamination, b) drilling separate multiple holes generally downwardly substantially vertically into the formation, and at different multiple lateral sides of said locus of contamination in said in situ formation, and to depths at least approximating the depths of said locus of contamination, said holes being drilled to have diameters between 5 and 8 inches, c) providing multiple delivery pipes, having perforations along their lengths, and extending said pipes downwardly into said separate holes so that some perforations are spaced apart generally vertically at said lateral sides of said locus of contamination, and so that said perforations face toward said locus of contamination and sidewardly thereof, said delivery holes drilled to downwardly terminate generally sidewardly of said locus of contamination so that the formation under said locus of contamination is everywhere maintained undisturbed, and providing a supply pipe connected to said delivery pipes, d) filling gravel into said holes about said pipes, e) providing and dispersing into the locus of contamination fluid containing said bacteria, and $O_2$, said fluid and $O_2$ being delivered via said supply pipe, said delivery pipes and gravel into said formation to carry said bacteria into said locus of contamination, from different sides of said locus, the gravel acting to aid dispersal of the fluid, bacteria and $O_2$, whereby the bacteria consume hydrocarbon to produce $CO_3$ and water in said locus of contamination without the formation containing the contamination having been excavated, the $O_2$ delivered under pressure to form bubbles in the fluid being dispersed into the formation, to aid such dispersal, f) said dispersing also acting to produce a bacteria barrier about said locus of contamination for intercepting flow of the hydrocarbon from said locus, g) said formation containing said contamination being maintained in an in situ, unexcavated and undrilled state between said vertically drilled holes at opposite sides of said locus of contamination, during said dispersing.

2. The method of claim 1 wherein the bacteria become dispersed in the fluid and $O_2$ in the gravel and are selected from the group consisting of Achromobacter, Arthorobacter, Aspergillus, Bacillus, Candida, Cladosporium, Corynebacterium, Myrothecium, Nocardia, Punicillium, Phialorphora, Pseudomonas, Rhodotorula, Streptomyces, and Trichoderma.

3. The method of claim 1 wherein the bacteria become dispersed in the fluid and $O_2$ in the gravel and consist essentially of a blend of anaerobic and facultative organisms.

* * * * *